April 21, 1959    I. W. LOVELADY ET AL    2,882,994
SEPARATOR APPARATUS
Filed April 12, 1955
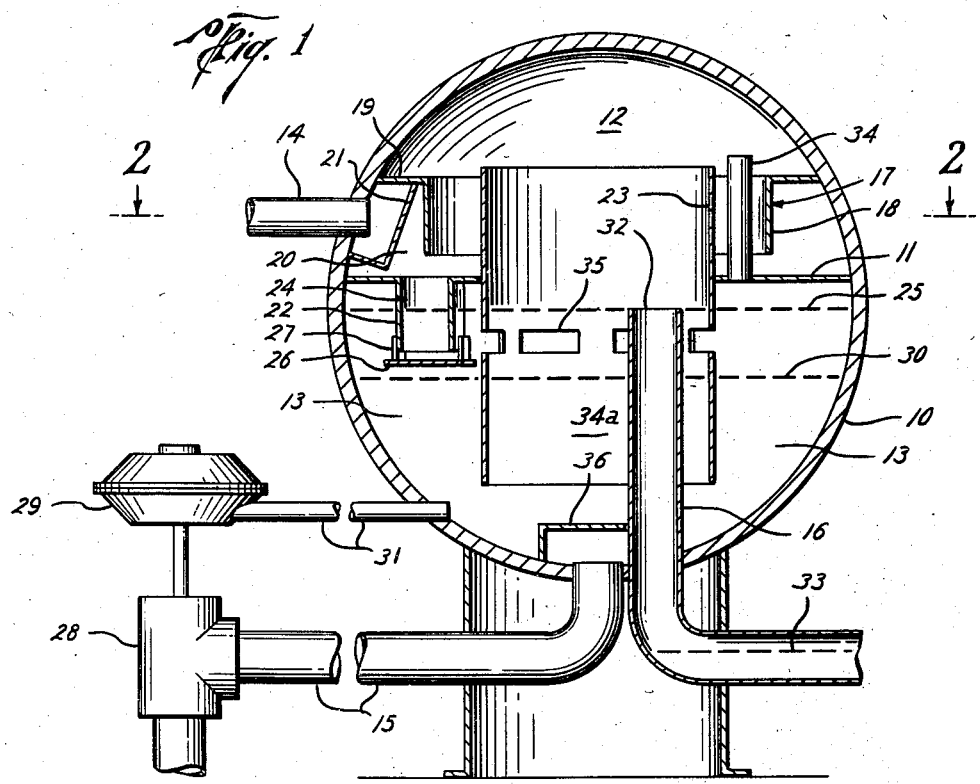
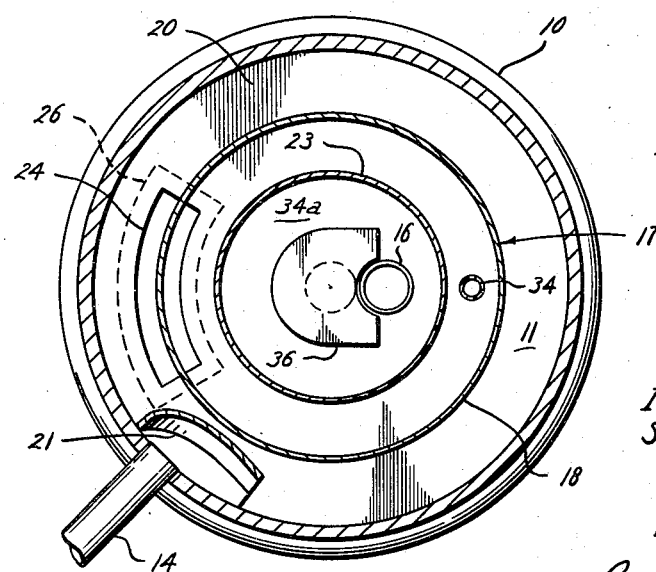
Isaac W. Lovelady
Sanford P. Kroeker
INVENTORS
BY
ATTORNEYS April 21, 1959
I. W. LOVELADY ET AL
2,882,994
SEPARATOR APPARATUS
Filed April 12, 1955
5 Sheets-Sheet 2
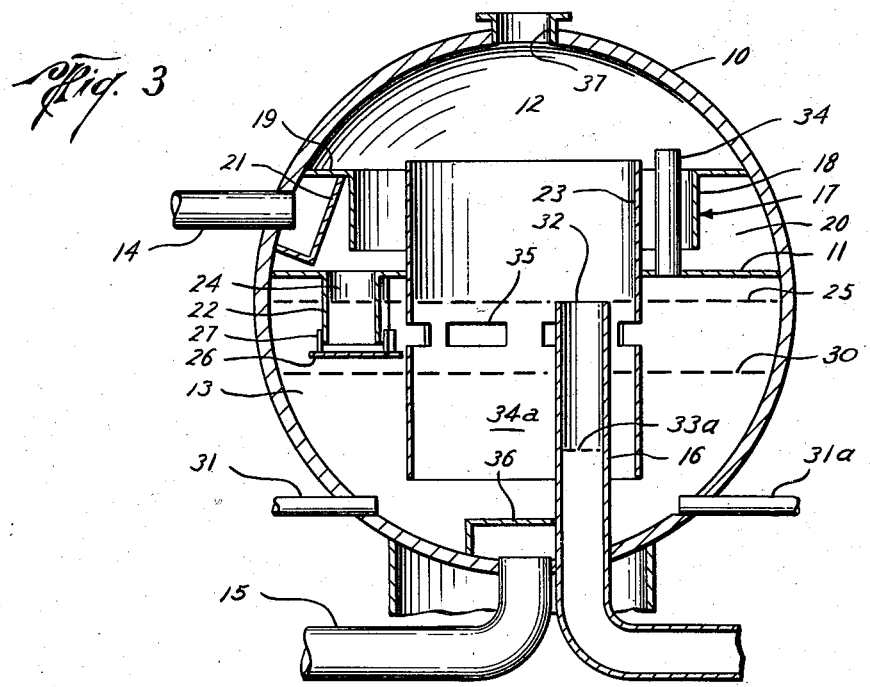
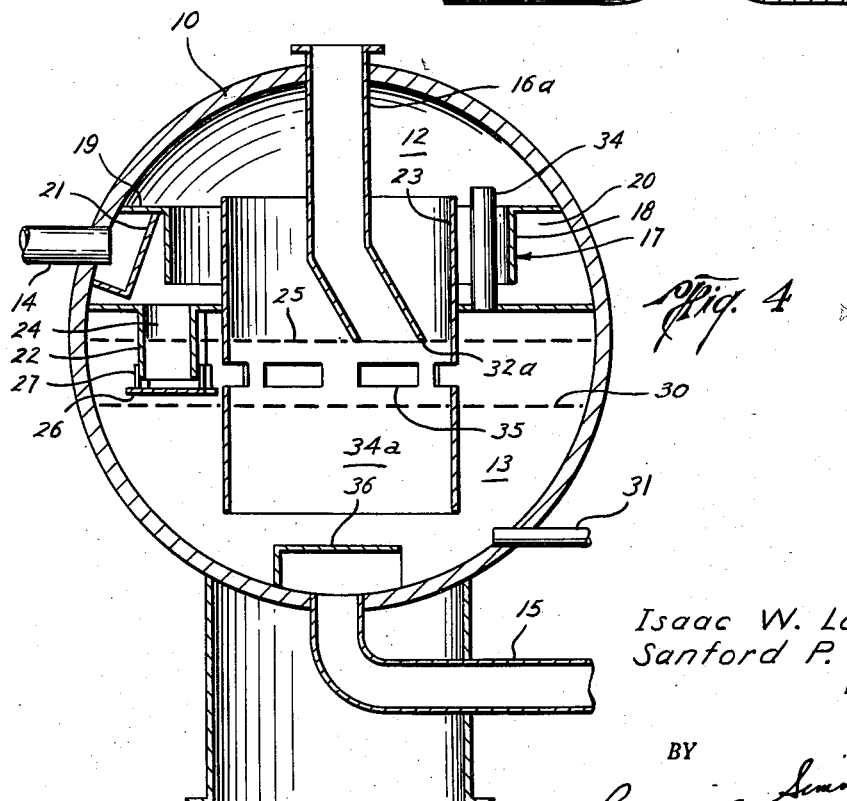
Isaac W. Lovelady
Sanford P. Kroeker
INVENTORS
BY
ATTORNEYS

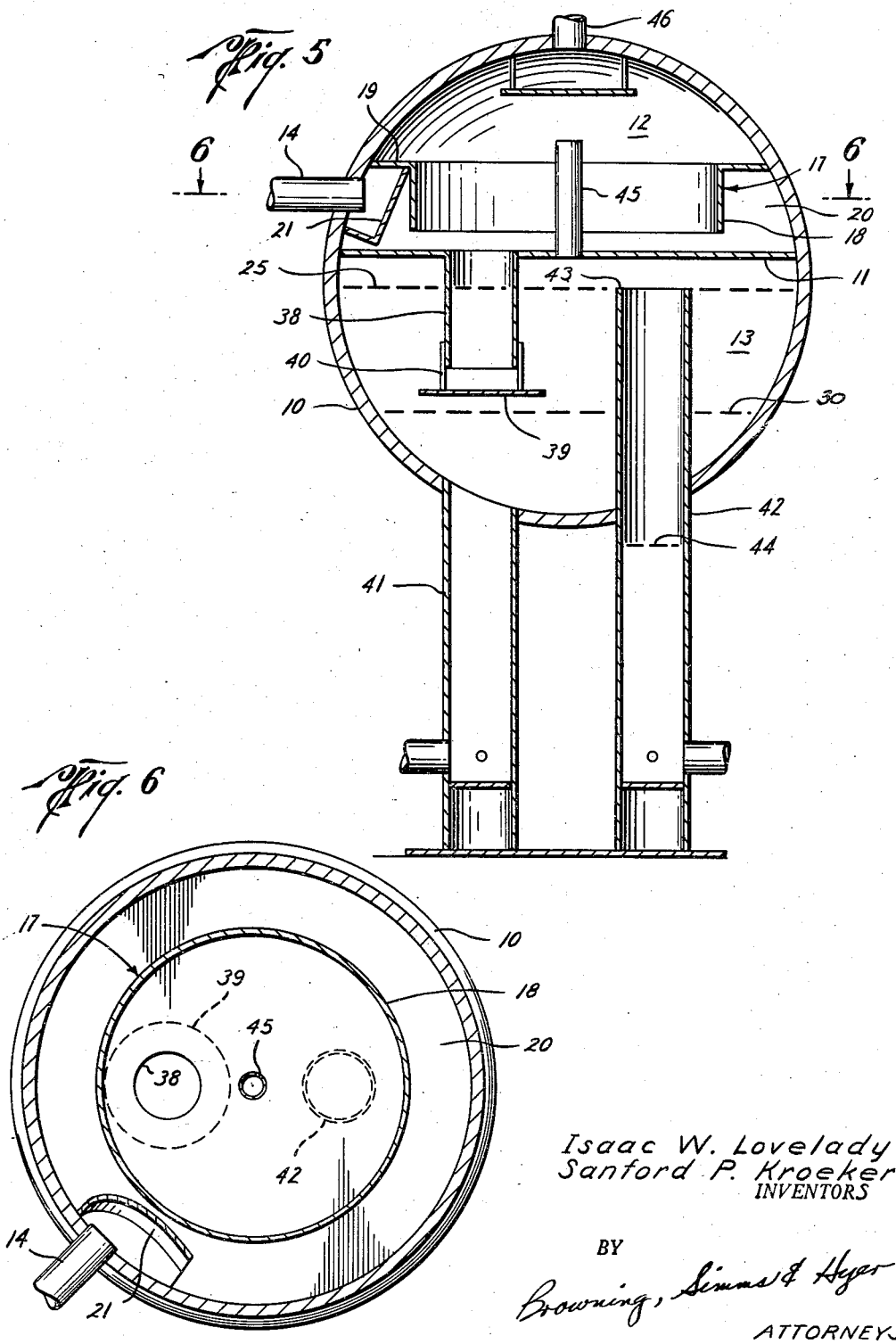

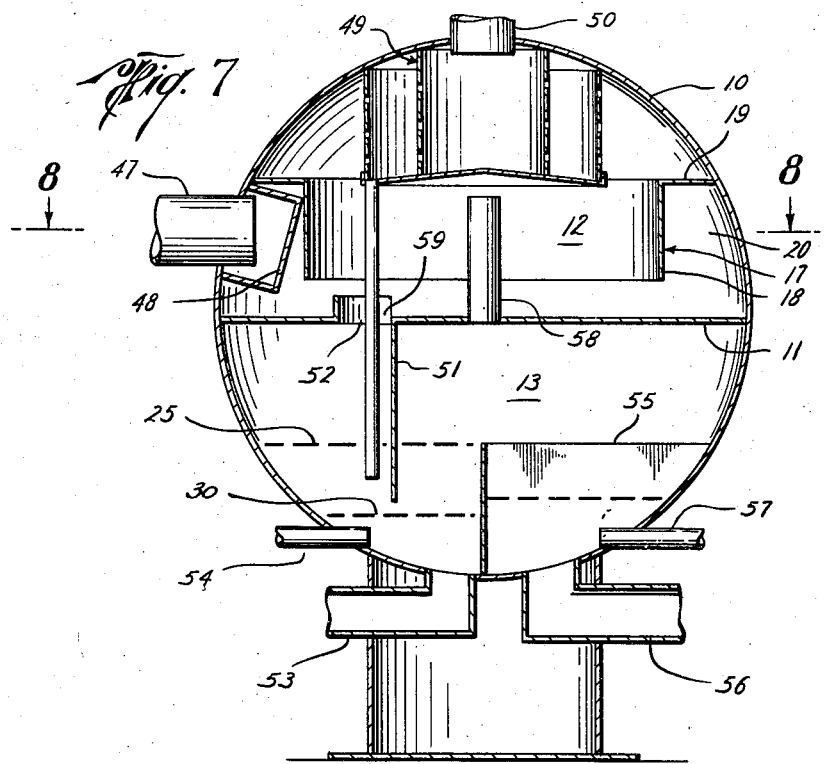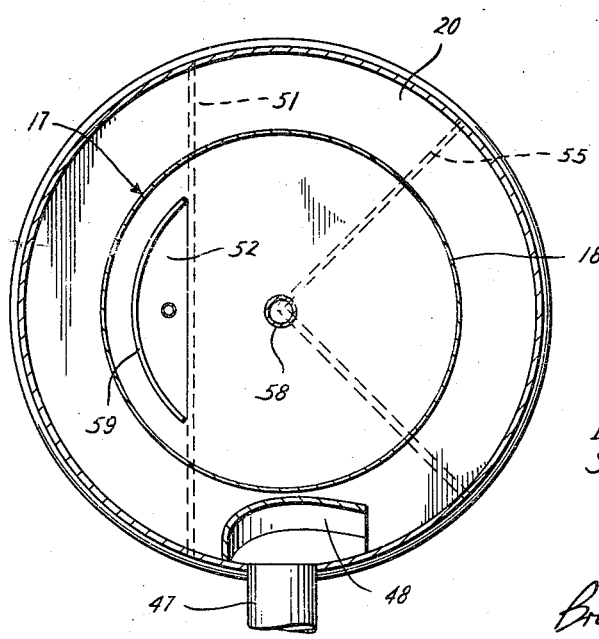

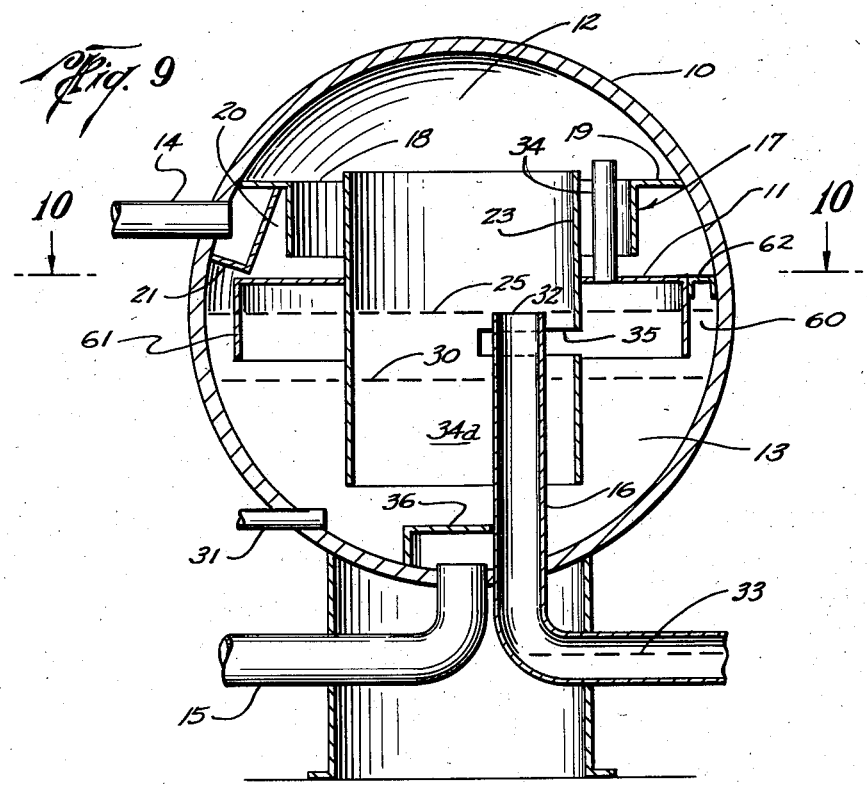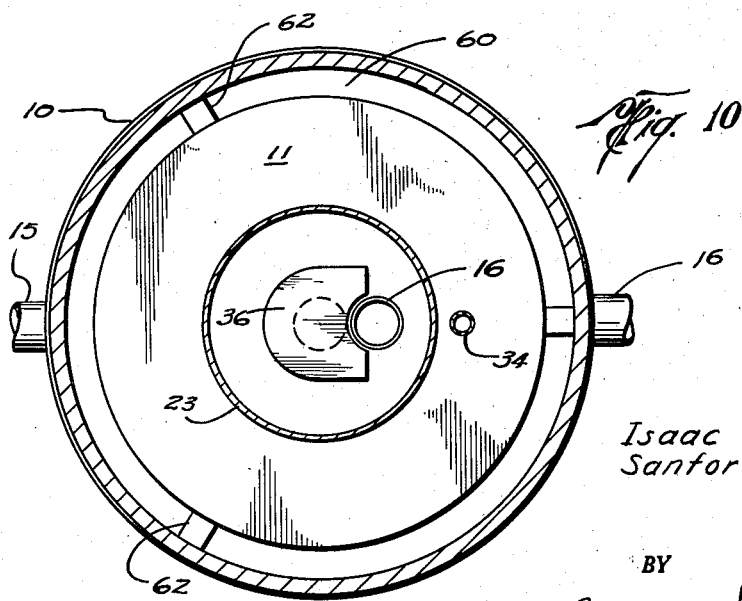

United States Patent Office 2,882,994
Patented Apr. 21, 1959

2,882,994

SEPARATOR APPARATUS

Isaac W. Lovelady and Sanford P. Kroeker, Odessa, Tex., assignors to Sivalls Tanks, Inc., Odessa, Tex., a corporation of Delaware Application April 12, 1955, Serial No. 500,857

14 Claims. (Cl. 183—2.7)

This invention relates to improved apparatus for separating a fluid mixture into its gas and liquid phases. In one of its aspects, this invention relates to apparatus for separating a heavier liquid from a lighter liquid and gas of the mixture, wherein such apparatus provides a maximum of strength and separating capacity with a minimum requirement of space and parts. In another of its aspects, it relates to a separator constructed in a manner to provide increased interface area therein for more efficient separation of gas from liquid.

In many oil and gas wells, the well fluids produced are a mixture of petroleum gas and crude oil in the form of an emulsion containing "free water" which may be readily broken up. In some cases, it is desirable to separate these three phases of the mixture from one another at or near the production location in order that each phase may be drawn off through a separate line and disposed of in suitable fashion. In other cases, it is more desirable to merely separate or "knockout" and dispose of the free water from the oil and gas. For example, in offshore drilling operations, a free water knockout separator enables the water to be dumped immediately back into the ocean and the oil and gas conveyed to shore by a single pipeline.

Still further instances arise in which it is necessary only to separate an oil phase from gas of an oil and gas mixture. A separator especially designed for accomplishing this latter purpose is disclosed in our co-pending application entitled "Liquid and Gas Separator," Serial Number 439,692, filed June 28, 1954, now Patent No. 2,756,837, issued July 31, 1956. An aim of the invention of this co-pending application was to provide within a spherical vessel, having the structural advantages well known in the art as well as others pointed out in said application, a novel arrangement of parts with sufficient oil-gas interface area to enable separation of these two phases.

The problems presented by the foregoing are multiplied when it is further desired to separate one liquid phase from another within a spherical vessel. An object of this invention is to provide a spherical vessel in which are disposed not only sufficient interface areas for liquid-gas separation but also a settling chamber of sufficient capacity to permit the gravity separation of a heavier from a lighter phase of the liquid, such that free water may be knocked out from an emulsion and withdrawn from the vessel separately from the oil and gas phases.

Another object is to provide a separator of the type defined in the foregoing object in which the oil and gas phases may also be withdrawn separately from one another.

Yet another object is to provide a spherical separator which is easily and readily adaptable for change-over between a free water knockout and an oil, gas and water separator.

A further object of this invention is to provide a separator of this general type which requires in effect only two chambers within the spherical vessel so that the parts may be kept to a minimum.

A still further object is to provide a separator of this general type in which the gas separation and settling chambers are so arranged as to permit their adjacent placement within the spherical vessel without interference by the operation of one with the other.

Yet a further object is to provide, in a spherical separator of the type disclosed in the aforementioned co-pending application, increased interface area in the gas separation chamber for effecting a more efficient separation of gas from liquid.

Other objects, advantages and features of this invention will be apparent to one skilled in the art upon a consideration of the written specification, the attached claims and the annexed drawings.

In the drawings, wherein like reference characters are used throughout to designate like parts:

Fig. 1 is a vertical sectional view of one embodiment of the separator of the present invention with the inlet thereto rotated into a position in the plane of the section;

Fig. 2 is a horizonal sectional view of the embodiment of the separator of Fig. 1, taken substantially along broken line 2—2 of Fig. 1 and with the inlet shown in its proper position;

Figs. 3 and 4 are vertical sectional views of further embodiments of the separator of the present invention, each showing the inlet to the separator in a rotated position similarly to Fig. 1;

Fig. 5 is a vertical sectional view of still another embodiment of this invention, again with the inlet to the separator in a rotated position;

Fig. 6 is a horizontal sectional view of the embodiment of Fig. 5 taken substantially along broken line 6—6 and showing the inlet to the separator in its proper position;

Fig. 7 is a vertical sectional view of yet another embodiment of the invention, also showing the inlet to the separator in a rotated position;

Fig. 8 is a horizontal sectional view of the embodiment of Fig. 7, taken substantially along broken line 8—8 and also showing the inlet in its proper position;

Fig. 9 is a vertical sectional view of a still further embodiment of the invention; and Fig. 10 is a horizontal sectional view of the embodiment of Fig. 9 taken substantially along broken line 10—10 of Fig. 9.

In each of the embodiments of the present invention there is provided a spherical vessel having first and second chambers with an inlet connecting the exterior of the vessel with the first chamber for introducing the mixture of gas and multiple liquids into the separator. The first chamber is so constructed and arranged as to provide an interface area to effect the separation of gas from liquids in the mixture. Conduit means connect the first and second chambers to permit the passage of liquids separated in the first chamber into the second chamber wherein they are contained in a relatively quiescent state to permit a heavier liquid to settle out from a lighter liquid phase. Outlets are provided from the vessel for drawing off the heavier liquid phase separately from the lighter liquid and gas and, if desired, for also drawing off the lighter liquid separately from the gas.

The first or gas separation chamber is in many respects similar to a corresponding chamber within the separator of the aforementioned co-pending application. That is, the gas separation chamber is preferably provided with guide means including a substantially cylindrical portion spaced from the inner wall of the vessel and above a plate which separates the gas separation chamber from the settling chamber. The aforementioned inlet for the mixture of gas and liquids is provided with means for diverting a stream of the mixture circumferentially about the inner wall of the vessel within the space between the guide means and the vessel, thereby enabling an improved separation of the gas from liquids, as described and discussed in the aforementioned co-pending application.

However, in accordance with certain embodiments of the present invention, the plate beneath the guide means is provided with a peripheral portion adjacent the vessel which is imperforate entirely therearound such that the swirling and circumferentially directed stream of gas and liquid is caused to continue such movement as it falls onto the plate. In this manner, greatly increased interface area is provided within the gas separation chamber with only a slight structural modification over the construction of the aforementioned copending application. As a further refinement, the plate may be provided with an upstanding rim so located as to further direct the swirling stream as it falls onto the plate and to delay as long as possible the entrance of the liquid separated from the stream into the conduit connecting with the settling chamber beneath the plate.

Turning now particularly to the drawings, the embodiment of this invention shown in Figs. 1 and 2 includes a spherical vessel 10 which is supported in any suitable manner in the upright position shown, and which is divded by a substantially horizontally extending plate 11 into a gas separation chamber 12 above a settling chamber 13. An inlet 14 connects the exterior of the vessel with the gas separation chamber 12 for introducing a stream of the mixture of gas and liquid into the vessel, and outlets 15 and 16 from the vessel are provided for the water or heavier liquid phase of the mixture and the oil or lighter liquid and gas phase, respectively.

As pointed out in the aforementioned co-pending application, and as is well known in the industry, the spherical construction of the vessel enables the use of a minimum amount of metal for any given internal working pressure. Also, the spherical shape enables a more economical fabrication and installation of the internal parts and partitions of the vessel, inasmuch as the fitting of these parts to the vessel wall is along a circular path.

The aforementioned guide means within the gas separation chamber is designated in its entirety by the numeral 17 and comprises a substantially cylindrical hollow portion 18 arranged coaxially of the vertical axis of the vessel. As can be seen from Fig. 1, the lower end of the hollow cylindrical portion 18 is spacd above plate 11 and inwardly from the inner wall of the vessel 10, while its upper end is connected to the vessel as by a substantially ring-like member 19. Thus, the guide means is imperforate between its upper and lower ends to define a space 20 between the guide means and the vessel wall. While the particular construction shown is preferred, it will be understood from the description to follow that the ring 19 may be eliminated and the guide means made substantially cylindrical between its opposite ends.

The inlet 14 is provided with a diverter 21 comprising a substantially shell-like member connected to the vessel at one end and open at the other for directing the incoming stream against the inner wall of the vessel in a path substantially circumferentially thereof. The details of the diverter 21 are not important as far as this invention is concerned, although it will be noted that the guide ring 19 forms the upper wall of the diverter while the lower transversely extending wall thereof is connected to the inner wall of the vessel.

In operation, the whirling gas of the stream is caused to hug the substantially cylindrical portion 18 of the guide means until such gas escapes under the lowermost edge of the cylindrical portion and upwardly through its hollow center to the upper portion of the gas separation chamber 12, from which it is disposed from the vessel in a manner to be described hereinafter. The liquid of the stream is plastered onto the vessel wall by virtue of its greater density than that of the gas. Upon spending its initial velocity, the liquid falls by gravity onto the substantially horizontal plate 11 which provides another interface upon which further separation of the gas and liquid may take place.

The gas separation and settling chambers are connected by a conduit 22 having its inlet end substantially flush with the plate 11 such that the initially separated liquid is caused to flow into the settling chamber. Extending through the plate 11 substantially concentrically within the guide means 17 is a hollow cylinder 23 open at both ends for connecting the gas separation and settling chambers, similarly to the conduit 22. As shown in Fig. 1, the upper end of cylinder 23 extends a substantial distance into the gas separation chamber 12 above the plate 11 to form in effect a rim concentrically of the cylindrical portion of the guide means. It will also be noted, particularly from Fig. 2, that the plate 11 is provided with a peripheral portion adjacent the vessel which is imperforate entirely therearound.

This imperforate portion about the periphery of the plate 11 cooperates with the whirling liquid gravitating from the space 20 to promote a more efficient separation of gas and liquid by providing a continuous interface upon which the stream may continue its whirling movement for a substantially longer time, prior to flowing into the settling chamber, than was possible in the construction of the separator of the aforementioned co-pending application. The rim portion upstanding from the plate 11 and defined by the upper end of cylinder 23 further facilitates separation by defining the path of the stream on the plate. It will be understood that these novel features are of utility in promoting more efficient gas and liquid separation in gas and liquid separators of the type shown, for example, in the aforementioned co-pending application as well as in the gas and multiple liquid separators shown in the present application.

It can be seen from Fig. 2 that the opening 24 through the conduit 22 is substantially arcuate to facilitate this imperforate peripheral portion. The lower end of conduit 22 extends below a liquid level 25 within the settling chamber 13 such that any turbulence occasioned by the flow of liquid into the conduit is confined as much as possible to the interior of the conduit. For further reducing such turbulence within the settling portion of the settling chamber, the lower end of the conduit is provided with a deflector plate 26 connected in slightly spaced relation to the lower end thereof by means of brackets 27. Thus, the force of downwardly directed flowing fluid into the conduit 22 will be dissipated at least to some extent by this deflecting medium.

The liquids of the mixture are contained in the settling chamber 13 in a relatively quiescent state such that a heavier liquid, in this instance free water, is permitted to settle out from a lighter liquid, in this instance oil. The outlet 15 for the heavier liquid has its inlet end at the lowermost portion of the settling chamber 13 and is provided with a valve 28 operable by a floatless type pilot 29 (both of which are indicated diagrammatically) for maintaining a predetermined interface level 30 between the lighter and heavier liquids. As shown, the pilot 29 is fluidly connected to the settling chamber by a line 31. This level control mechanism may comprise any conventional commercial equipment. For example, there may be used a "Kimray" high pressure liquid level controller and a "Kimray" pilot operated high pressure oil valve.

The predetermined liquid level 25 is maintained by a weir 32 on the upper inlet end of the lighter liquid or oil and gas outlet 16. Of course, in order that the plate 11 provide an interface for the separation of gas from oil in the gas separation chamber 12, this level 25 is maintained beneath the plate 11. In this embodiment of the invention, the outlet 16 is not provided with any back pressure control means which would raise the level of liquid shown at 33 above the upper level of the horizontal portion of the outlet. In this manner, gas is also disposed of through the outlet 16, passing from the upper end of gas separation chamber 12 into the cylinder 23 and out of the outlet 16 above the liquid level 33. An equalizing pipe 34 connects the chambers 12 and 13 at a point above liquid level 25 as well as above the upper level of plate 11 and exteriorly of cylinder 23. This pipe 34 permits gas separating from the liquid in the settling chamber 13 to pass upwardly into the upper portion of the gas separation chamber where it may combine with the already separated gas for disposal in the manner previously described.

The interior of the cylinder 23 defines a zone 34a within settling chamber 13 in which the liquids may be contained in a more quiescent state than is possible outside of the cylinder. Thus, the cylinder is imperforate between its upper end and interruptions 35 disposed between the liquid and heavier and lighter liquid interface levels 25 and 30, respectively, for conducting lighter liquid or oil separated from conduit 22 into the quiescent zone 34a. The lower open end of the cylinder 23 is spaced above the lower portion of the vessel wall so as to provide in effect another interruption below the interface level 30 for the passage between the exterior and interior of the zone of the heavier liquid or water separated within chamber 13. Of course, further separation is enabled within the settling zone 34a and, as shown, the weir 32 at the inlet end of the gas and oil outlet 16 is disposed within the quiescent zone 34a.

As shown in Fig. 1, a guard member 36 is provided over the inlet end of water outlet 15 and has an opening thereto arranged at its end furtherest or approximately 180° from the conduit 22. In this manner, there is provided the longest possible horizontal travel of the heavier liquid or water from its entrance to its exit from the settling chamber, thus promoting a more efficient separation of the heavier and lighter liquid. For this same reason, the weir 32 of outlet 16 is disposed as shown in the drawings.

As mentioned in the brief description of the drawings, the inlet 14 as it is shown in Fig. 1 has been rotated from its true position so as to appear in the vertical section of this figure with the conduit 22. The true and preferred position of the inlet 14 and diverter 21 with respect to the conduit 22 is approximately that shown in Fig. 2. In this position, the stream from the diverter is caused to travel a maximum distance circumferentially above the plate 11 before reaching the opening 24 through the conduit 22.

The embodiment of Fig. 3 is quite similar to that of Figs. 1 and 2 and, for that reason, a great majority of the reference characters of the two embodiments correspond to one another. The difference in these two embodiments lies in the fact that in the Fig. 3 embodiment the oil, or lighter liquid phase, is separated from the gas within the separator and the two are separately disposed of. For this purpose, a back pressure is maintained in any suitable manner, as for example, through a floatless type level control similar to that of Fig. 1 and operated through a pilot line 31a, upon the outlet 16 so as to raise the level of liquid therein to a position within the vertical portion of the outlet such as 33a. This level may vary, of course, between the weir 32 and the upper portion of the horizontal section of the outlet pipe. Inasmuch as gas is not permitted to escape through the outlet 16, there is provided in the uppermost portion of the gas separation chamber 12 an outlet 37 which may be provided with a suitable valve for maintaining a predetermined pressure of gas within the vessel, in a manner well known in the art, and as shown, for example, in the aforementioned co-pending application. A comparison of Figs. 1 and 3 will indicate the relative ease with which the conversion may be made between the free water knockout of Figs. 1 and 2 and the oil, gas and water separator of Fig. 3.

The embodiment shown in Fig. 4 is also quite similar to that of Figs. 1 and 2, as well as to that of Fig. 3. In the Fig. 4 embodiment, however, the outlet 16a for oil and gas is inverted from the position shown in Fig. 1 such that the oil and gas passes beneath an inverted weir 32a on the lower inlet end of outlet and disposed away from outlet 22. Of course, the weir 32a maintains a predetermined liquid level 25. The difference in function between the Fig. 4 embodiment and that of Figs. 1 and 2 is believed to be apparent from the differences in construction. Of course, the two embodiments are similar in that they are both free water knockouts, as distinguished from the oil, gas, and water separator of Fig. 3.

The gas separation chamber 12 as well as the inlet 14 and diverter 21 of the separator of Figs. 5 and 6 correspond in many respects to similar portions of the above described embodiments of this invention. This similarity, and particularly the arrangement of the inlet and diverter with respect to the guide means 17 is apparent from Figs. 5 and 6. It will be further noted that the plate is provided with an imperforate peripheral portion entirely therearound adjacent the inner wall of the vessel, for a purpose previously described.

Turning now to certain of the differences, it can be seen that the conduit 38 connecting the gas separation and settling chambers is substantially cylindrical in shape and disposed somewhat more radially inwardly than the conduits 22 of the above described embodiments. As shown in Fig. 5, there may be provided a deflector plate 39 supported from the lower open end of conduit 38 by means of brackets 40.

A distinguishing feature of this embodiment of the invention is the provision of outlets 41 and 42 for the heavier and lighter phases, respectively, of the liquid which are of a height sufficient to insure proper level control by means of floatless type valves. That is, each of the outlets 41 and 42 includes an upstanding conduit which will contain a column of sufficient hydrostatic head to operate suitable valve control. The upper end or inlet to the lighter liquid outlet 42 is provided with a weir 43 which maintains the predetermined liquid level 25 within the settling chamber 13. Suitable valve control may be provided in the outlet 41 to maintain a predetermined interface level 30.

A gas equalizer pipe 45 connects the upper end of settling chamber 13 with the gas separation chamber 12 above plate 11 such that gas separating from the liquid within the chamber 13 is permitted to pass into the chamber 12 for disposal outwardly of the vessel through the gas outlet 46 in the uppermost portion of gas separation chamber 12.

This particular Figs. 5 and 6 embodiment of the invention is, therefore, an oil, gas, and water separator. It is contemplated, however, that the structure of Figs. 5 and 6 may be converted to a free water knockout by means of relatively minor modifications. Thus, the outlet 46 could be eliminated and the pipe 45 enlarged so as to accommodate the passage from chamber 12 into chamber 13 of the gas separated within the gas separation chamber without forcing such gas to pass beneath the lower edge of conduit 38. Any back pressure upon the outlet 42 could be lowered to a point such that the liquid level 44 would be below the horizontal portion of the outlet, similarly to that described in connection with Fig. 1. Thus, gas could escape with the oil through outlet 42.

The gas separation chamber 12 of the embodiment of Figs. 7 and 8 corresponds to that previously described in connection with the other embodiments of the present invention in that it contains a substantially horizontally extending plate 11 having a peripheral portion adjacent the inner wall of the vessel which is imperforate entirely therearound. The similarity of this embodiment of the separator to the separator of the aforementioned co-pending application may be seen in the construction of the diverter 48 which is fabricated of a part separate from the guide means 17.

This Figs. 7 and 8 embodiment may also be provided with a mist extractor designated in its entirety by the numeral 49 and disposed in the gas separation chamber 12 surrounding the gas outlet 50 in the uppermost portion thereof. The details of this mist extractor do not form a part of the present invention and other apparatus may be used, such as, for example, the extractor described in connection with the aforementioned co-pending application.

A conduit connecting the gas separation and settling chambers is provided by an opening 52 through plate 11 adjacent and to one side of a depending wall 51. As can be seen from Fig. 7, the lower edge of wall 51 extends below the liquid level 25 such that turbulence within the settling chamber 12 on the side of the wall 51 opposite opening 52 is kept to a minimum. This lowermost edge of the wall 51 is interrupted, however, above a predetermined heavier and lighter liquid interface level 26 which is maintained by suitable valve control on the water or heavier liquid outlet 53 and pilot line 54.

The liquid level 25 is maintained by means of a weir in the form of a V-shaped wall 55 within the settling chamber 13. As can be seen from Fig. 7, the lighter liquid passing over the weir is conducted out of the vessel end through outlet 56 and the level thereof may be controlled by suitable valve mechanism connected to the outlet and pilot lines 56 and 57, respectively. The V-shaped construction of the wall 55 enables a maximum volume or space within the settling chamber 13 for the separation of lighter and heavier liquids from one another. Also, as in previously described embodiments, both the liquid outlets 53 and 56 are disposed as far as reasonably possible from the conduit connecting the chambers 12 and 13.

As in the previously described embodiments, a gas equalization pipe 58 connects the upper portion of settling chamber 13 with the gas separation chamber 12 above the upper level of plate 11. Thus, gas separating from the liquid in the settling chamber 13 is permitted to escape upwardly into gas separation chamber 12 through the pipe 58. Of course, gas separating beneath plate 11 and to the left (in Fig. 7) of wall 51 may escape into chamber 12 through the conduit-providing opening 52.

A rim 59 upstanding from plate 11 and arranged substantially concentrically of the cylindrical portion 18 of guide means 17 is provided for substantially the same purpose as the upwardly extending portion of cylinder 23 in the embodiments of Figs. 1 to 4. That is, this rim 59 serves to prolong the whirling or circumferentially directed motion of the stream of liquid on the plate 11. However, this arrangement of the rim 59 is preferred over that previously described inasmuch as it further serves to delay as long as possible the flow of the initially separated liquid into the opening 52 connecting the chambers 12 and 13. Such delaying action is enabled inasmuch as the rim 59 is disposed radially outwardly of the conduit, as distiguished from the disposition of the rim radially inwardly of the conduit 22 in the case of the embodiments of Figs. 1 to 4. Also, as shown, it is preferred that the rim 59 define the outermost dimension of opening 52.

Similarly to the embodiment of Figs. 5 and 6, the separator shown in Figs. 7 and 8 is easily converted from an oil, gas, and water separator into a free water knockout. Thus, the pipe 58 may be enlarged to a size sufficient to accommodate the passage of gas from chamber 12 into chamber 13, such that the gas is not caused to flow under the lower edge of wall 51 and disrupt the settling action within chamber 13. With this modification and further by the lowering of the level of liquid within outlet 56 below the upper edge of its horizontal portion, the gas outlet 50 could be eliminated and gas drawn off from the vessel with the oil through a common outlet 56.

The embodiment of the invention shown in Figs. 9 and 10 is quite similar to that of Figs. 1 and 2 and, therefore, reference characters for corresponding elements of the two embodiments will be found to be alike. The principal difference lies in the fact that the conduit connecting the gas separation chamber 12 and settling chamber 13 of the separator of Figs. 9 and 10 comprises an annular opening 60 through the horizontal plate 11 rather than the arcuately shaped opening 24 disposed inwardly of the imperforate peripheral portion of the horizontal plate of the separate of Figs. 1 and 2.

More particularly, the horizonatl plate 11 of the Figs. 9 and 10 emodiment is interrupted short of peripheral contact with the spherical vessel 10, and the edge of plate 11 spaced from the vessel is provided with a downturned, substantially vertical flange 61. The lowermost edge of the flange extends below liquid level 25 so as to reduce to a minimum any turbulence within the settling chamber 13.

The width of the annular space between the flange 61 and the vessel has been exaggerated for illustrative purposes in the drawings. As a matter of fact, the width of this space will be kept small so that the circumferential motion of the incoming stream will not be transmitted to the settling chamber. As can be seen from Figs. 9 and 10, suitable brackets 62 may be provided at spaced points about the plate and flange for fixedly supporting them within the sphere.

Except for the differences inherent in the modifications noted above, the separating function of the embodiment of Figs. 9 and 10 is similar to that of Figs. 1 and 2, and need not be repeated herein. It will also be understood that the free water knockout separator of Figs. 9 and 10 may be easily converted to an oil, water and gas separator in the same manner as suggested in connection with the embodiment of Fig. 3.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gas and multiple liquid separator, comprising a spherical vessel having a first chamber above a second chamber, an inlet connecting the exterior of the vessel with the first chamber for introducing a mixture of gas and multiple liquids into the first chamber, means within the first chamber for effecting an initial separation of gas from the liquids, conduit means connecting the first and second chambers for the passage of initially separated liquids into the latter, means providing a relatively quiescent zone within the second chamber to permit separation of the liquids into lighter and heavier phases, and means for drawing off the heavier liquid phase from the vessel separately from the lighter liquid phase and gas, said last-mentioned means comprising a lighter liquid phase outlet above a heavier liquid phase outlet and means for maintaining the level of the interface between said phases intermediate said outlets.

2. A gas and multiple liquid separator, comprising a spherical vessel having a plate extending substantially horizontally thereacross to define a first chamber above a second chamber, an inlet connecting the exterior of the tank with the first chamber for introducing a mixture of the gas and multiple liquids into the first chamber, means for causing said mixture to be spread over the vessel walls and onto the plate to promote initial separation of gas from the liquids, a conduit through the plate connecting the first chamber with the second chamber for conducting initially separated liquids into the second chamber, means for containing the liquids in said second chamber in a relatively quiescent state to permit separation of a heavier from a lighter liquid, outlets from the vessel for drawing off the heavier liquid separately from the lighter liquid and gas, means for maintaining a liquid level in the vessel beneath the plate, and means for maintaining a heavier and lighter liquid interface level above the heavier liquid outlet and below the lighter liquid outlet.

3. A separator of the character defined in claim 2, wherein said liquid level maintaining means comprises a weir on the inlet to the lighter liquid outlet.

4. A separator of the character defined in claim 2, wherein another conduit extends through the plate to connect the second chamber above the liquid level with the first chamber above the plate to permit the passage of gas therebetween, and there is a common outlet for both the gas and lighter liquid.

5. A separator of the character defined in claim 2, wherein another conduit extends through the plate to connect the second chamber above the liquid level with the first chamber above the plate to permit the passage of gas therebetween, and separate outlets are provided for the lighter liquid and gas.

6. A separator of the character defined in claim 2, wherein the outlet from the conduit in the second chamber extends below the liquid level.

7. A separator of the character defined in claim 2, wherein the outlet for drawing off the heavier liquid and the conduit are disposed toward opposite sides of the vessel.

8. A gas and multiple liquid separator, comprising a spherical vessel having a plate extending substantially horizontally thereacross to define a first chamber above a second chamber, an inlet connecting the exterior of the tank with the first chamber for introducing a mixture of the gas and multiple liquids into the first chamber, a conduit through the plate connecting the first chamber with the second chamber for conducting liquids separated from gas in said first chamber into the second chamber, means for maintaining a predetermined liquid level in the second chamber, a wall depending from the plate within the second chamber to define a quiescent zone therein on its side opposite from the conduit, an interruption in the wall beneath the liquid level, means for maintaining a heavier and lighter interface level in said second chamber beneath the interruption but above the lower end of the wall, and outlets from the vessel for drawing off the heavier liquid separately from the lighter liquid and gas.

9. A separator of the character defined in claim 8, wherein the liquid level maintaining means comprises a weir within the quiescent zone.

10. A separator of the character defined in claim 9, wherein said weir is the inlet to the lighter liquid outlet.

11. A gas and multiple liquid separator, comprising a spherical vessel having a plate extending substantially horizontally thereacross to define a first chamber above a second chamber, an inlet connecting the exterior of the tank with the first chamber for introducing a mixture of the gas and multiple liquids into the first chamber, a conduit through the plate connecting the first chamber with the second chamber for conducting liquids separated from gas in said first chamber into the second chamber, means for maintaining a predetermined liquid and a heavier and lighter interface levels within the second chamber, a substantially cylindrical member extending through the plate at a location other than the conduit to enclose a quiescent zone, the side walls of said member being imperforate except for interruptions therein intermediate and below the liquid and interface levels, and outlets from the vessel for drawing off the heavier liquid separately from the lighter liquid and gas, said lighter liquid outlet including a conduit extending within said cylindrical element, and said liquid level maintaining means comprising a weir at the inlet end of said last-mentioned conduit.

12. A gas and multiple liquid separator, comprising a spherical vessel having a plate extending substantially horizontally thereacross to define a first chamber above a second chamber, an inlet connecting the exterior of the tank with the first chamber for introducing a mixture of the gas and multiple liquids into the first chamber, means within said first chamber for effecting an initial separation of gas from the liquids, a gas outlet from the first chamber, an opening through the plate connecting the first and second chambers for conducting the initially separated liquids into the second chamber, outlets from the second chamber for a lighter and a heavier phase of said liquids, the lighter phase outlet having a weir at its inlet for maintaining a predetermined liquid level within said second chamber, and means for maintaining a predetermined lighter and heavier liquid phase interface in said second chamber above the heavier phase outlet.

13. A separator of the character defined in claim 12, wherein the opening through the plate is provided with a conduit depending therefrom to a level beneath the predetermined liquid level in the second chamber.

14. A separator of the character defined in claim 12, wherein a wall depends from the plate intermediate the plate opening and the weir to a level beneath the predetermined liquid level in the second chamber.

References Cited in the file of this patent

UNITED STATES PATENTS

| | | |
|---|---|---|
| 2,232,948 | Ihrig et al. | Feb. 25, 1941 |
| 2,619,187 | Hayes et al. | Nov. 25, 1952 |
| 2,664,963 | Lovelady et al. | Jan. 5, 1954 |
| 2,678,699 | Fowler | May 18, 1954 |
| 2,681,150 | Reid | June 15, 1954 |
| 2,710,071 | Kinser et al. | June 7, 1955 |
| 2,713,919 | Walker et al. | July 26, 1955 |
| 2,756,837 | Lovelady et al. | July 31, 1956 |